(12) United States Patent
Lee et al.

(10) Patent No.: US 9,967,736 B2
(45) Date of Patent: *May 8, 2018

(54) METHOD FOR SAVING AN IMAGE FROM A CAMERA APPLICATION OF A PORTABLE ELECTRONIC DEVICE

(71) Applicant: BLACKBERRY LIMITED, Waterloo (CA)

(72) Inventors: Matthew Richard Lee, Belleville (CA); David Noel Vanden Heuvel, Kanata (CA); Engin Akyurekli, Nepean (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/597,292

(22) Filed: May 17, 2017

(65) Prior Publication Data

US 2017/0251358 A1 Aug. 31, 2017

Related U.S. Application Data

(63) Continuation of application No. 15/154,705, filed on May 13, 2016, now Pat. No. 9,668,123, which is a (Continued)

(51) Int. Cl.
*H04W 8/18* (2009.01)
*G06F 3/0484* (2013.01)
(Continued)

(52) U.S. Cl.
CPC ........ *H04W 8/183* (2013.01); *G06F 3/04845* (2013.01); *H04M 1/27455* (2013.01);
(Continued)

(58) Field of Classification Search
CPC ............. H04M 1/27455; H04M 1/576; H04M 1/274508; H04M 1/233; H04M 1/72544;
(Continued)

(56) References Cited

U.S. PATENT DOCUMENTS 6,865,386 B2 * 3/2005 Aoyama ............... H04M 1/576
379/142.06
7,133,571 B2 11/2006 Cheatle
(Continued)

OTHER PUBLICATIONS

Lee, Matthew Richard, et al. "Method for Saving an Image From a Camera Application of a Portable Electronic Device", U.S. Appl. No. 11/616,918, filed Dec. 28, 2006, now U.S. Pat. No. 9,344,548, issued May 17, 2016.
(Continued)

*Primary Examiner* — Michael Osinski
(74) *Attorney, Agent, or Firm* — Perry + Currier Inc.

(57) ABSTRACT

An image is saved to a contact record or set as a home screen directly from a camera application of a portable electronic device. The method includes: capturing an image using a camera that is integrated into the portable electronic device, selecting at least a portion of the image, selecting a contact record from an address book application or selecting a set as home screen option.

20 Claims, 11 Drawing Sheets

Related U.S. Application Data continuation of application No. 11/616,918, filed on Dec. 28, 2006, now Pat. No. 9,344,548.

(51) Int. Cl.
| | |
|---|---|
| *H04M 1/2745* | (2006.01) |
| *H04M 1/57* | (2006.01) |
| *H04M 1/725* | (2006.01) |
| *H04N 5/77* | (2006.01) |
| *H04N 5/907* | (2006.01) |

(52) U.S. Cl.
CPC ....... *H04M 1/576* (2013.01); *H04M 1/72544* (2013.01); *H04M 1/72555* (2013.01); *H04N 5/772* (2013.01); *H04N 5/907* (2013.01); *H04M 2250/52* (2013.01)

(58) Field of Classification Search
CPC .......... H04M 1/72555; H04M 2250/52; G06F 3/0482; G06F 3/04842; G06F 3/04845; G06T 2207/20132; H04N 5/23296; H04N 5/2628; H04N 5/772; H04N 5/907; H04W 8/183
See application file for complete search history.

(56) References Cited

U.S. PATENT DOCUMENTS

| | | | | |
|---|---|---|---|---|
| 7,802,201 | B2* | 9/2010 | Lee | G06F 3/0481 345/167 |
| 7,855,714 | B2* | 12/2010 | Scott | G06F 1/1626 345/156 |
| 7,949,113 | B2* | 5/2011 | Tysowski | G06F 17/3028 379/142.04 |
| 8,396,514 | B2* | 3/2013 | Adams | H04M 1/576 379/142.04 |
| 8,495,451 | B2 | 7/2013 | Song et al. | |
| 8,498,451 | B1* | 7/2013 | Agopian | H04M 1/27455 382/118 |
| 8,504,080 | B2* | 8/2013 | Jo | G06F 17/24 455/466 |
| 8,538,483 | B2* | 9/2013 | Rentto | H04M 1/2745 455/418 |
| 8,798,335 | B1* | 8/2014 | Agopian | H04M 1/27455 382/118 |
| 8,909,301 | B2* | 12/2014 | Adams | H04M 1/576 379/93.23 |
| 9,344,548 | B2* | 5/2016 | Lee | G06F 3/04845 |
| 9,668,123 | B2* | 5/2017 | Lee | H04W 8/183 |
| 2002/0094806 | A1 | 7/2002 | Kamimura | |
| 2002/0180863 | A1 | 12/2002 | Fukuda | |
| 2004/0001105 | A1* | 1/2004 | Chew | H04M 1/72583 715/817 |
| 2004/0027474 | A1 | 2/2004 | Aoyama et al. | |
| 2004/0102225 | A1* | 5/2004 | Furuta | H04M 1/27455 455/566 |
| 2004/0207722 | A1* | 10/2004 | Koyama | H04M 1/27455 348/14.02 |
| 2005/0143124 | A1 | 6/2005 | Kennedy et al. | |
| 2006/0280364 | A1* | 12/2006 | Ma | G06K 9/00456 382/173 |
| 2006/0288297 | A1* | 12/2006 | Haitani | G06F 1/1632 715/739 |
| 2006/0288298 | A1* | 12/2006 | Haitani | G06F 1/1632 715/739 |
| 2006/0290792 | A1* | 12/2006 | Nikkanen | H04N 5/2628 348/240.2 |
| 2007/0035513 | A1 | 2/2007 | Sherrard et al. | |
| 2007/0036313 | A1* | 2/2007 | White | H04M 15/06 379/142.17 |
| 2008/0090607 | A1 | 4/2008 | Kraft et al. | |
| 2008/0250066 | A1* | 10/2008 | Ekstrand | H04M 1/274516 |
| 2012/0176333 | A1* | 7/2012 | Kim | G06F 3/0482 345/173 |

OTHER PUBLICATIONS

Lee, Matthew Richard, et al. "Method for Saving an Image From a Camera Application of a Portable Electronic Device", U.S. Appl. No. 15/154,705, filed May 13, 2016, now U.S. Pat. No. 9,668,123, issued May 30, 2017.

Notice of Allowance and Fees Due dated Jan. 31, 2017 for U.S. Appl. No. 15/154,705.

Non-Final Rejection dated Sep. 28, 2016 for U.S. Appl. No. 15/154,705.

* cited by examiner

METHOD FOR SAVING AN IMAGE FROM A CAMERA APPLICATION OF A PORTABLE ELECTRONIC DEVICE

CROSS-REFERENCE TO RELATED APPLICATIONS

This application is a continuation of U.S. patent application Ser. No. 15/154,705, filed May 13, 2016, now U.S. Pat. No. 9,668,123, issued May 30, 2017, which is a continuation of U.S. patent application Ser. No. 11/616,918, filed on Dec. 28, 2016, now U.S. Pat. No. 9,344,548, issued May 17, 2016, which is incorporated herein by reference.

FIELD

The present disclosure relates to portable electronic devices having cameras, in particular, a method for saving an image from a camera application of a portable electronic device.

BACKGROUND

As technology advances, electronic devices continue to become smaller and include more features. Today, electronic devices often include phone, email, media player and camera capabilities. For the most part, these features are integrated to provide a user-friendly interface when performing tasks that involve more than one feature. For example, a user is able to make a phone call or send an email by accessing a contact from a single address book. Similarly, the user is able to take and send a picture to a contact directly without performing an intermediate step of saving the picture on the device.

Although there is a great deal of integration between the different features of the electronic device, there are still areas where the user is required to navigate between different features and perform multiple steps in order to complete a simple operation. Integration of the camera with the other features of the device is one area, in particular, where efficiency and friendliness of the user interface could be improved.

It is therefore desirable to provide seamless integration between the camera and at least one other feature in an electronic device.

BRIEF DESCRIPTION OF THE DRAWINGS

The embodiments will be better understood with reference to the following Figures in which like numerals denote like parts and in which.

DETAILED DESCRIPTION

Figure 1:
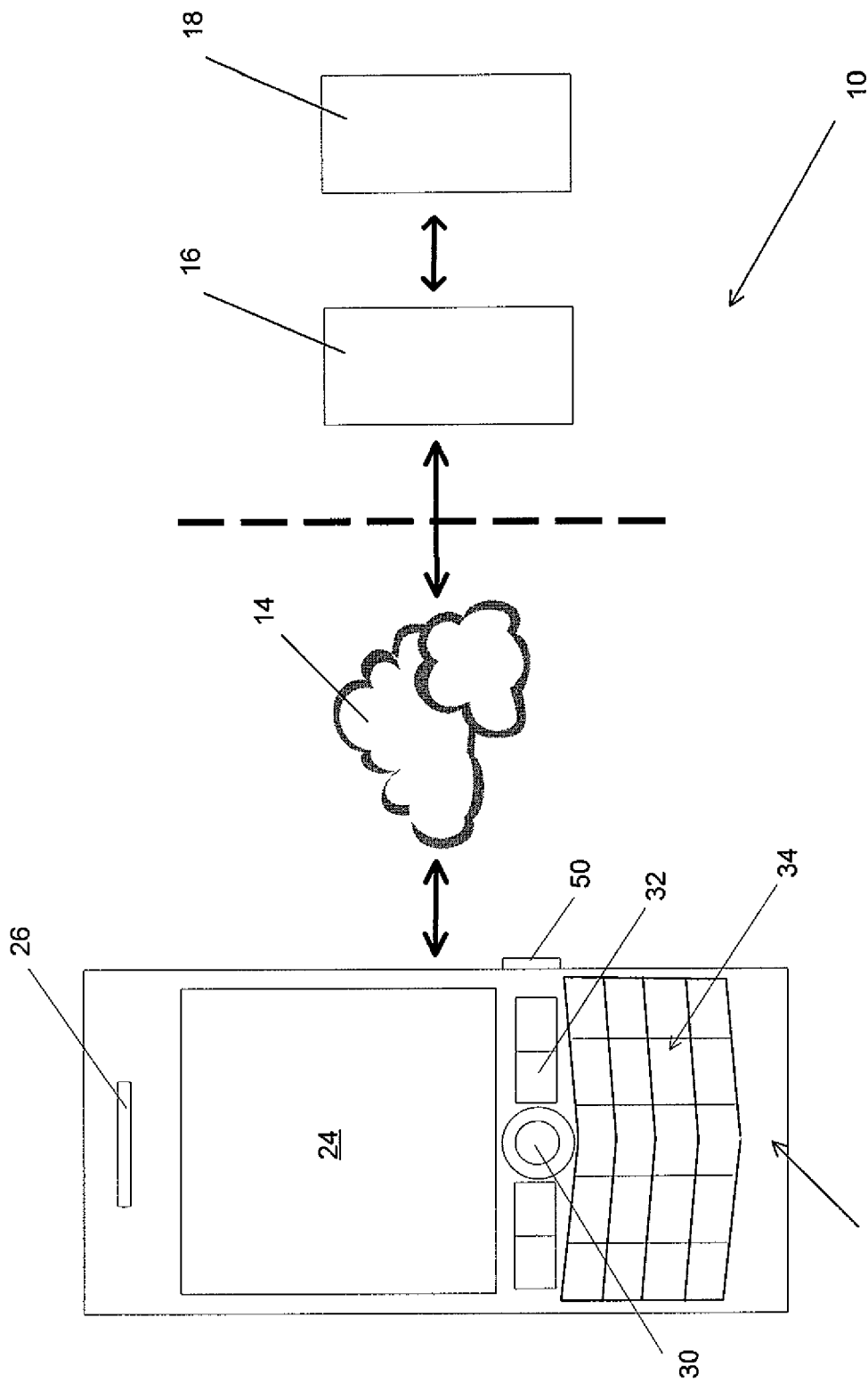
FIG. 1 is a schematic diagram of a wireless communication system.

According to one aspect there is provided a method for saving an image in an address book application of a portable electronic device, the method including: capturing an image using a camera, the camera being integrated into the portable electronic device; selecting at least a portion of the image; selecting a contact name to be associated with the image from a list of contact names, each of the contact names corresponding to a contact record that is stored in the address book application; and saving the image in the contact record of the address book application.

According to another aspect there is provided a portable electronic device for saving an image in an address book application of the portable electronic device, the portable electronic device including: a camera for capturing an image, the camera being integrated into the portable electronic device; a camera application executable by a processor; a selection device for selecting at least a portion of the image and subsequently selecting a contact name to be associated with the image from a list of contact names, each of the contact names corresponding to a contact record that is stored in the address book application; wherein selection of the contact name associated with the image saves the image in the contact record.

By integrating the address book application and the camera, an image can be saved directly onto a contact record without requiring intermediate steps. Eliminating the intermediate steps including: saving the image on the device, retrieving the image and setting the image as the contact image makes the process more efficient and saves a significant amount of time for the user. In addition, by including the feature on the main camera menu, users are able to access it easily rather than having to navigate through multiple menus to find the feature.

According to another aspect there is provided a method for storing an image on a portable electronic device, the method including: capturing an image using a camera, the camera being integrated into the portable electronic device; selecting at least a portion of the image; saving the at least a portion of the image on the portable electronic device; identifying the at least a portion of the image as a new home screen image, the new home screen image replacing an existing home screen image; and displaying the new home screen image on the home screen of the portable electronic device.

According to yet another aspect there is provided a portable electronic device including: a camera for capturing an image, the camera being integrated into the portable electronic device; a camera application executable by a processor; a selection device for selecting at least a portion of the image; a processor for storing the at least a portion of the image on the portable electronic device, the at least a portion of the image being identified as a new home screen image and overwriting a previous home screen image; and a display for displaying the new home screen image.

Integrating the home screen setting function and the camera allows users to save a captured image as the new home screen image directly from the camera application without requiring intermediate steps. By including the feature on the main camera menu, users are able to access it easily rather than having to navigate through multiple menus to find the feature.

Referring now to FIG. 1, a communication system 10 for a portable electronic device 12 is generally shown. The portable electronic device 12 is operable to effect voice and data communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station. A server 18 handles wireless client requests from the portable electronic device 12. A firewall, or proxy server, 16, is provided between the server 18 and the Internet 14.

It will be appreciated that the portable electronic device 12 is movable within the coverage area and can be moved to coverage areas defined by other base stations. Further, as will be understood by one skilled in the art, wireless networks include GSM/GPRS, CDPD, TDMA, iDEN, Mobitex, DataTAC networks, EDGE, EVDO or UMTS and broadband networks such as Bluetooth™ and variants of 802.11.

Figure 2:
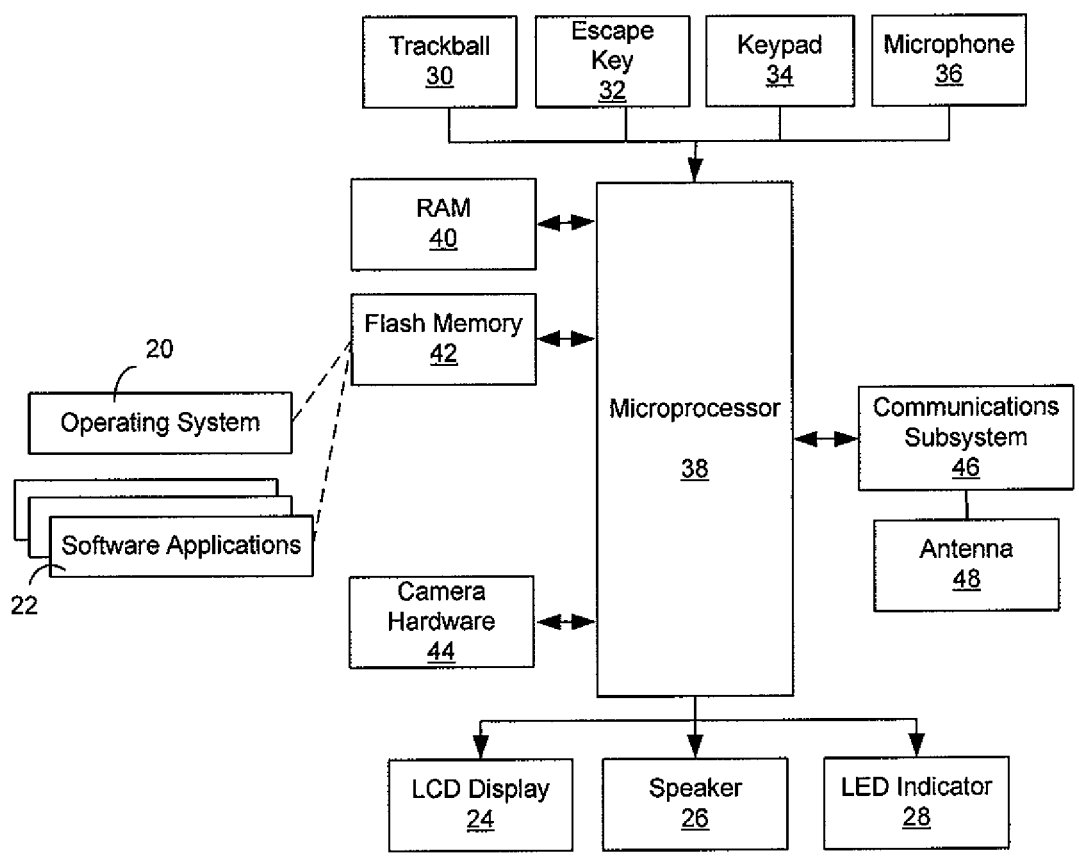
FIG. 2 is a block diagram of components of a portable electronic device according to an embodiment.

Referring now to FIG. 2, a block diagram of certain components, including internal components within the portable electronic device 12, is shown. The portable electronic device 12 is based on a microcomputer that includes a microprocessor 38 connected to a random access memory (RAM) unit 40 and a persistent storage device, which in the present embodiment is a flash memory 42 that is responsible for various non-volatile storage functions of the portable electronic device 12. Operating system software 20 executable by the microprocessor 38 is stored in the flash memory 42. It will be appreciated, however, that the operating system software 20 can be stored in other types of memory such as read-only memory (ROM). In the present embodiment, software applications 22 including Personal Information Manager (PIM) applications are stored in the persistent storage device 42 for execution by the microprocessor 38 for carrying out various functions. The microprocessor 38 receives input from various input devices including the trackball 30, the escape key 32, the keypad 34, and the camera hardware 44 and outputs to various output devices including the LCD display 24, the speaker 26 and the LED indicator 28.

As indicated above, the flash memory 42 stores a plurality of applications executable by the microprocessor 38 that enable the portable electronic device 12 to perform certain operations including the communication operations referred to above. Applications software is provided including, for example, PIM applications such as an email application, an address book application, a calendar application, a camera application and a tasks application, as well as other applications such as a Web browser application, an options application and a profiles application. The camera software is a Java application that interfaces with the camera hardware 44.

In a data communication mode, a received signal such as a text message or Web page download is processed by the communications subsystem 46 and input to the microprocessor 38 for further processing of the received signal for output to the LCD display 24. A user of the portable electronic device 12 can also compose data items within a software application such as an e-mail messaging application using the keypad 34, for example, in conjunction with the trackball 30 and the LCD display 24. Such composed items can then be transmitted over the communications network through the communications subsystem 46 and antenna 48.

Figure 3:
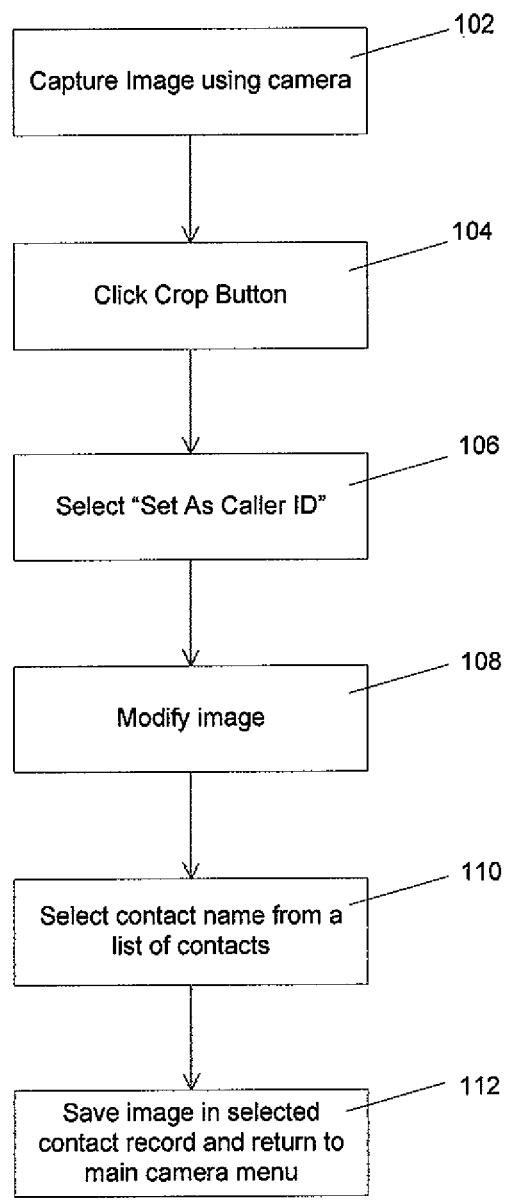
FIG. 3 is a flow chart showing a method for saving an image captured using a camera of the portable electronic device of FIGS. 1 and 2 in an address book application.

A method for saving an image in an address book application of a portable electronic device 12 is generally shown in FIG. 3. The method is implemented by the portable electronic device 12 and will be described with reference to FIGS. 4 through 9, which are screen shots of the display 46. The method is described using a trackball 30 as a selection device, however, it will be appreciated that other input devices may alternatively be used. For example, a pen device or trackwheel in combination with input keys may alternatively be used.

Figure 4:
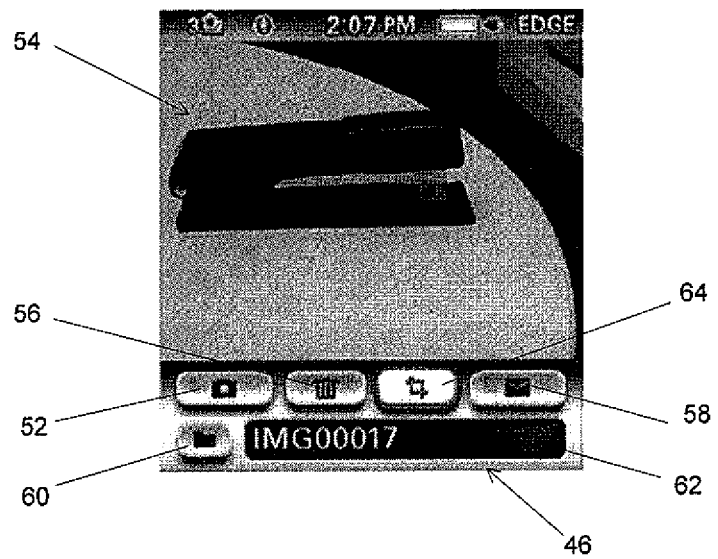
FIGS. 4-8 are screen shots depicting the method of FIG. 3.

In order to enter a camera mode, which is shown in FIG. 4, a user clicks a convenience key 50 that is provided on the right side of the device 12 and is shown in FIG. 1 to launch a camera application. Alternatively, the user may highlight and click a camera mode icon from a main menu (not shown). Once the device 12 is operating in camera mode, the user is able to capture an image 54 by clicking the convenience key 50 or using the trackball 30 to select a camera icon 52 that is provided on the display 24.

At step 102, the user captures an image 54 and has the option to select from several icons that correspond to camera functions: a trash can icon 56, an envelope icon 58, a folder icon 60 and a crop icon 62. Selection of the trash can icon 56 deletes the image 54, selection of the envelope icon 58 emails the image 54 to a specified email address and selection of the folder icon 60 saves the image 54. When the folder icon 60 is selected, the user is able to rename the image by editing the filename in an editable filename bar 62 using the keypad 34.

Figure 5:

The user selects the crop icon 64, as indicated at step 104, and is prompted to select a "Set As Caller ID" option 66, as shown in FIG. 5. At this stage, a "Set As Home Screen" option 68, which sets the image 54 as the user's home screen, is also available to the user.

Figure 6:
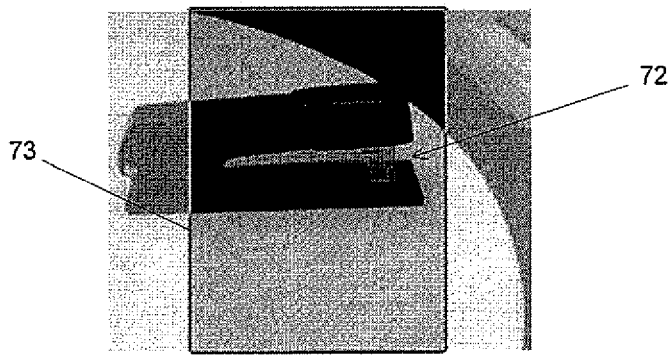

The user selects the "Set As Caller ID" option 66 from menu 70, as indicated at step 106, and a "Set As Caller ID" window appears on the display 46, as shown in FIG. 6. A crop area 72, which covers a portion of the image 54, is shown in the "Set As Caller ID" window. The crop area 72 is defined by a rectangle 73 and portions of the image 54 that are located outside of the crop area 72 are grayed out. The shape of the crop area 72 corresponds to a caller ID image shape, which is defined by the address book application. The caller ID image shape is set based on the format required by the dialing/receiving display on the portable electronic device 12. It will be appreciated by a person skilled in the art that the crop area 72 is not limited to being rectangular. The crop area 72 could be square, oval or any other two dimensional shape.

The crop area 72 is movable horizontally on the display 46 to allow for selection of a portion of the image 54. Panning the crop area 72 in the left and right directions using the trackball 30 allows the user to centre the crop area 72 on a subject that is off-centre, for example.

Figure 7:
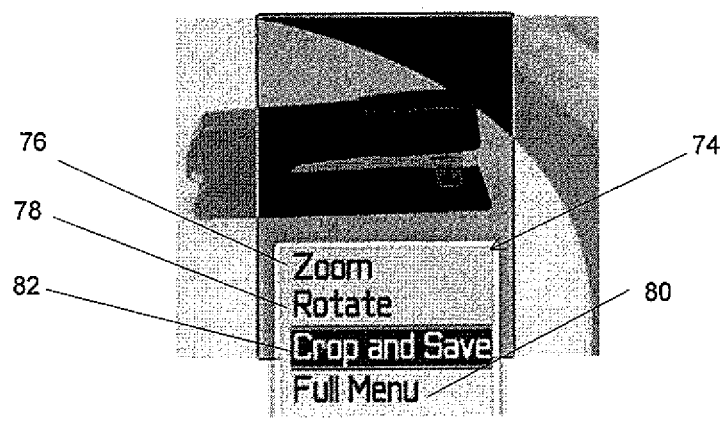

At step 108, the user has the option to modify the image 54. Clicking the trackball 30 from the "Set As Caller ID" window launches the crop menu 74, which is shown in FIG. 7. The user may select a "Zoom" option 76, which zooms in or out on the image 54, a "Rotate" option 78, which rotates the image 54 ninety degrees in a clockwise direction, or a "Full Menu" option 80, which expands the crop menu 74 to include additional options. The additional options include: "Zoom All", which resizes the image on the screen to fit the screen, "Zoom 1:1", which resizes the image on the screen to actual resolution size (i.e. the camera captures an image having 1280×1024 resolution and the screen resolution is 240×260), "Show Original", which resets any changes made and returns the user to the "Set As Caller ID" window of FIG. 6. The user may also select a "Cancel" option, which allows the user to exit the "Set As Caller ID" option 66, without saving changes. When the image 54 has been zoomed, the pan function is selectable to move the image in the left, right, up and down directions.

By using any or all of the pan, zoom and rotate options, the user may manipulate the image 54 to create a cropped image that appears as desired. Once image 54 has been modified and the user is satisfied with the appearance of the cropped image, the user clicks a "Crop and Save" option 82. Alternatively, the user may click the "Cancel" option and save the changes made, which has the same effect as selecting the "Crop and Save" option 82.

Figure 8:
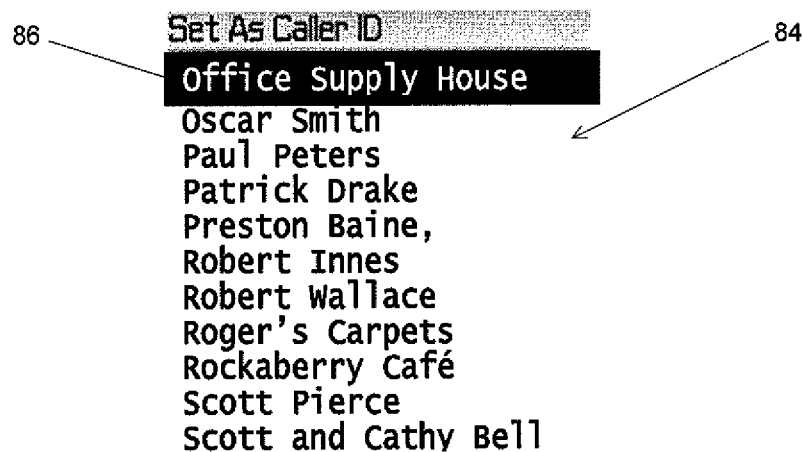
Figure 9:
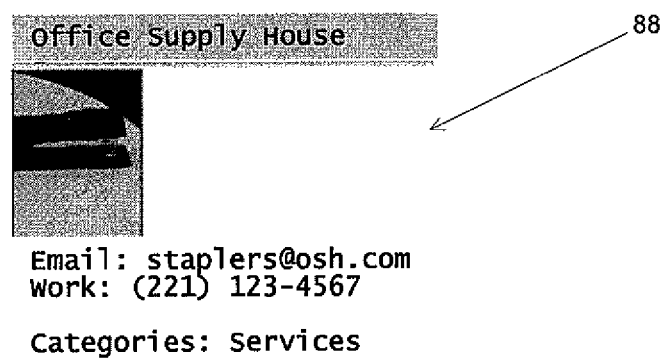
FIG. 9 is a screen shot of a contact record.

Clicking the "Crop and Save" option 82 launches a list of contact names 84, as shown in FIG. 8. Each contact name 86 corresponds to a contact record 88 that is stored in the address book application on the portable electronic device 12. The user scrolls through the list 84 and selects the contact name 86 that is to be associated with the cropped image, as indicated at step 110. Once the contact name 86 has been selected, the cropped image is saved in the corresponding contact record 88 and the user is returned to the main camera window of FIG. 4, as indicated at step 112. In the example of FIG. 8, "Office Supply House" is highlighted indicating that this contact name has been selected. By clicking the trackball 30 after highlighting the selected contact name, the cropped image is saved in the contact record 88 for "Office Supply House". The "Office Supply House" contact record 88 with the saved cropped image is shown in FIG. 9.

In some cases, a previously saved image may be stored on the contact record 86. The previously saved image could be a cropped image captured using the "Set As Caller ID" option 66 or the image could have been saved on the record from another source, such as an imported file, for example. If the device 12 detects that a previously saved image is stored in the contact record, the device will prompt the user to either overwrite the existing image with the newly captured image or cancel the "Set As Caller ID" request.

Figure 10:
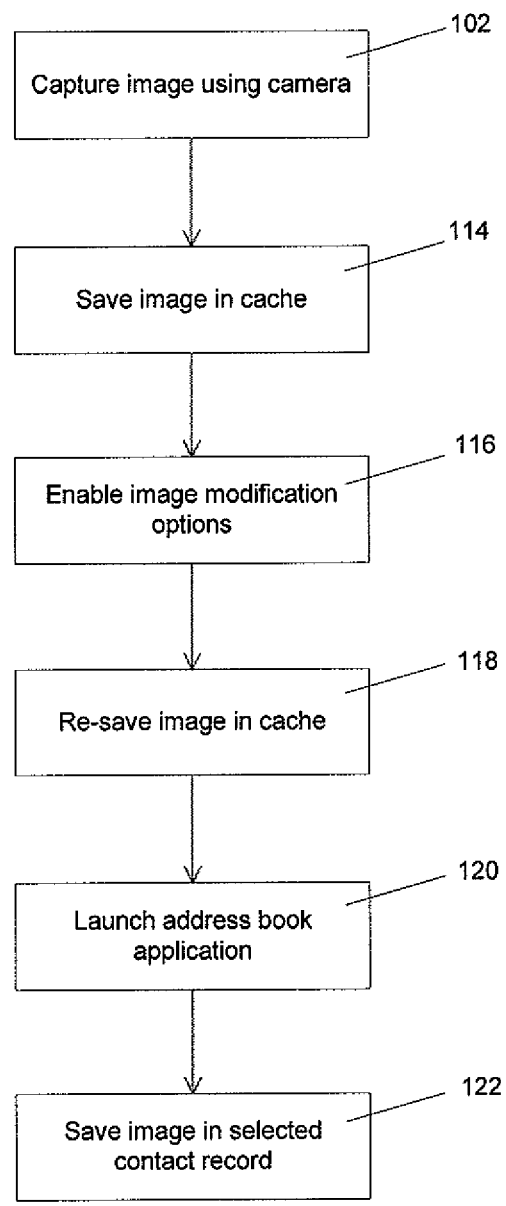
FIG. 10 is another flowchart showing the method for saving an image captured using a camera of the portable electronic device of FIGS. 1 and 2 in an address book application.

FIGS. 4 to 9 show the method for saving a camera-captured image in the portable electronic device address book application from the user-interface point of view. With reference to FIG. 10, the method will now be described with reference to the components of the portable electronic device 12.

At step 102, the user captures the image 54 using the camera hardware 44. The image 54 is then displayed on the display 46 and the corresponding image file is stored in cache memory on the device 12, as indicated at step 114. At step 116, image modification options are enabled in response to the user selecting the "Set As Caller ID" option 66. Using the keypad 34 and/or trackball 30, the user navigates through the options of the camera application to modify the image 54, as desired. The image file is saved following each step of the modification process, as indicated at step 118. In order to conserve memory resources, the single image file that is stored in cache memory is continually overwritten. When image modification is complete, the microprocessor 38 launches the address book application in response to selection of the "Crop and Save" option 82 by the user, as indicated at step 120. Following user selection of a contact name 84, the microprocessor 38 saves the image file that is currently stored in cache memory in address book application storage on the corresponding contact record 86, as indicated at step 122. The image file is then cleared from the cache memory.

Figure 11:
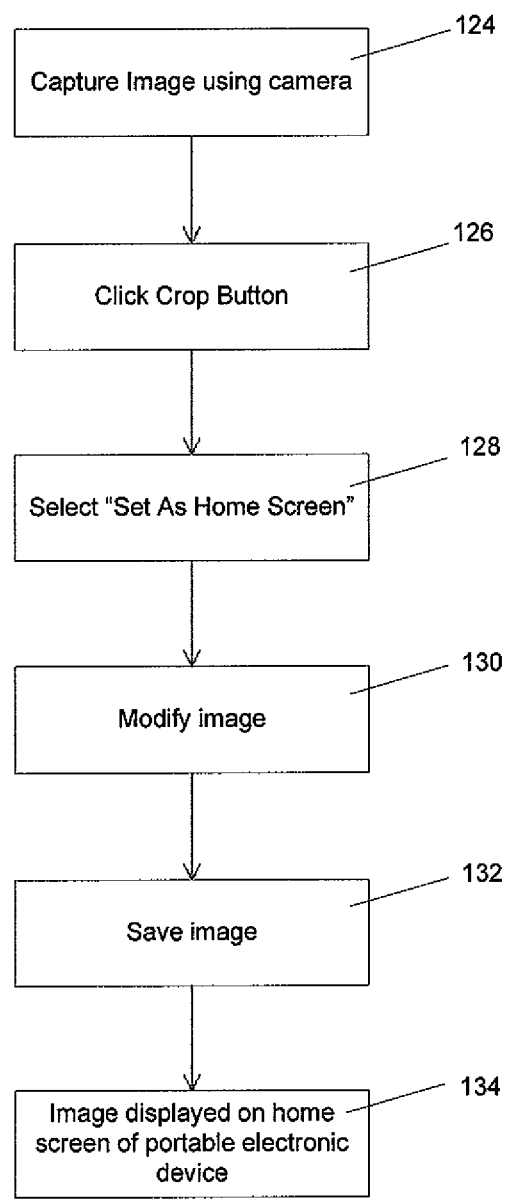
FIG. 11 is a flow chart showing a method for saving an image captured using a camera of the portable electronic device of FIGS. 1 and 2 as a home screen.

Referring to FIG. 11, a method for saving an image as a home screen of a portable electronic device 12 is generally shown. The method is implemented by the portable electronic device 12 and will be described with reference to FIGS. 12 through 15, which are screen shots of the display 46. The method is described using a trackball 30 as a selection device, however, it will be appreciated that other input devices may alternatively be used. For example, a pen device or trackwheel in combination with input keys may alternatively be used.

Figure 12:
FIGS. 12-15 are screen shots depicting the method of FIG. 11.
Figure 13:
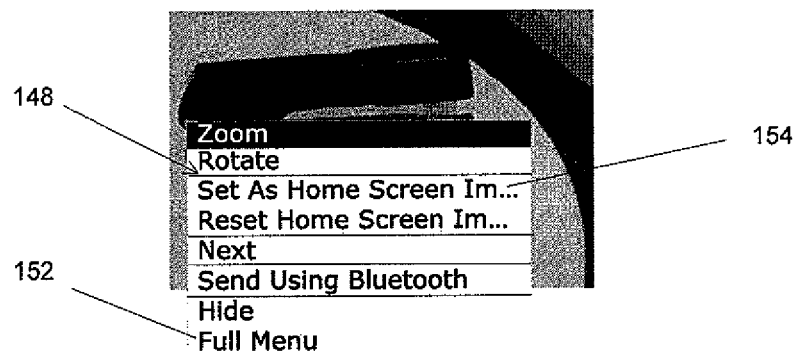
Figure 14:
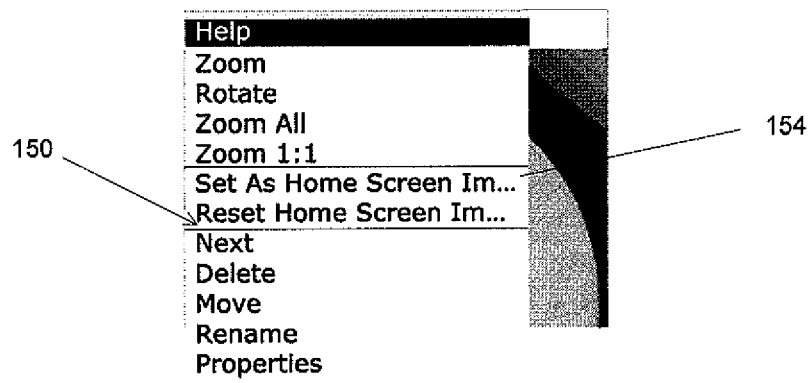
Figure 15:
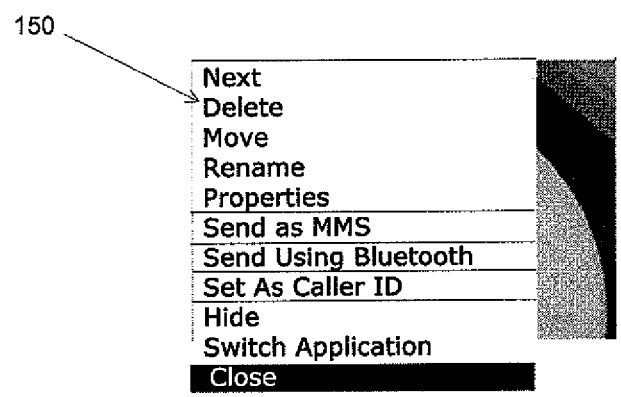

At step 124, the user captures an image 54 and selects the crop icon 64, as indicated at step 126. The user is then prompted to select the "Set As Caller ID" option 66 or a "Set As Home Screen" option 68, as shown in FIG. 12. At step 128, the user selects the "Set As Home Screen" option 68.

At step 130, the user is able to modify the image 54 by performing zoom and rotation operations, which have been described in relation to the "Set As Caller ID" option 66. Image modification options that are available are shown in menu 148, which is shown in FIG. 9, and menu 150, which is shown in FIGS. 9 and 10. Menu 150 is accessed by selecting a "full menu" option 152 from menu 149. Once the image 54 has been modified as desired, the user saves the image 54 by selecting a "Set As Home Screen Image" option 154 from the menu 148, 150, as indicated at step 132. When the user exits the camera application, the image 54 appears as a home screen image on the portable electronic device 12, as indicated at step 134.

Figure 16:
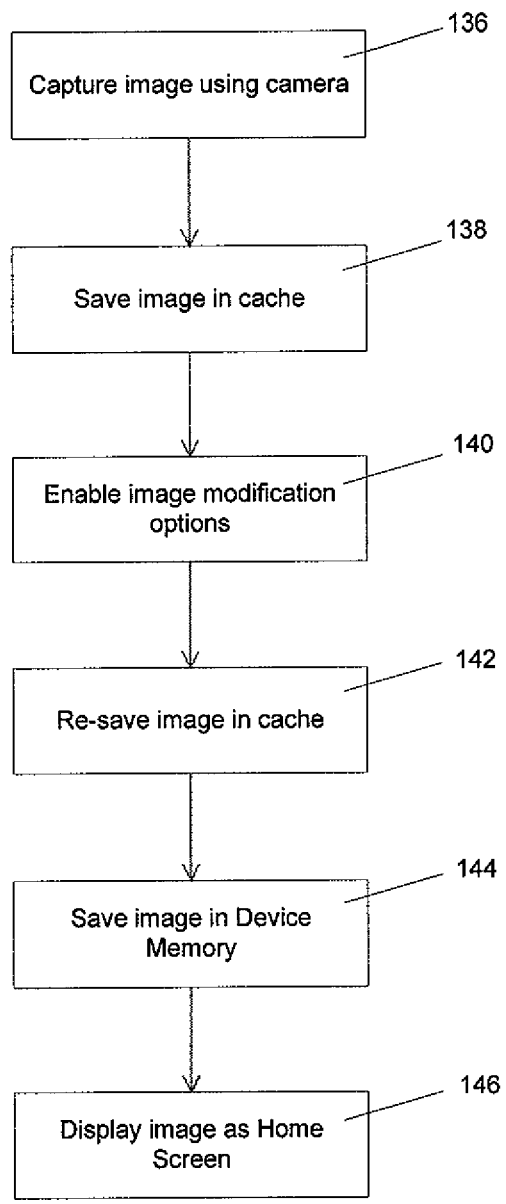
FIG. 16 is another flowchart showing a method for saving an image captured using a camera of the portable electronic device of FIGS. 1 and 2 as a home screen.

With reference to FIG. 16, the method for saving an image as a home screen of a portable electronic device 12 will now be described with reference to the components of the portable electronic device 12.

At step 136, the user captures the image 54 using the camera hardware 44. The image 54 is then displayed on the display 46 and the corresponding image file is stored in cache memory on the device 12, as indicated at step 138. At step 140, image modification options are enabled in response to the user selecting the "Set As Home Screen Image" option 68. Using the keypad 34 and/or trackball 30, the user navigates through the options of the camera application to modify the image 54, as desired. The image file is saved following each step of the modification process, as indicated at step 142. In order to conserve memory resources, the single image file that is stored in cache memory is continually overwritten. When image modification is complete, the microprocessor 38 saves the image on the device 12 in response to selection of the "Set As Home Screen Image" option 154 by the user, as indicated at step 144. The image is then displayed on the home screen of the device 12 when the user exits the camera application and the image file is cleared from the cache memory.

It will be appreciated that the zoom function is linked to the camera software and may be set to zoom in or out to any level. Further, the resolution of the image is dependent on the type of camera that is included in the device 12. The appearance of the image on the device is dependent on the resolution of the LCD display 46.

In another embodiment, the "Rotate" option 78 allows for free rotation of the image 54 so that the user is not limited to rotating the image 54 in ninety degree increments.

In the present embodiments, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

All modifications and variations that may occur to those skilled in the art are believed to be within the sphere and scope of the present embodiments.

What is claimed is:

1. A method performed by a device that includes a processor, a memory and a display, the method comprising:
    capturing an image using a camera of the device and displaying the captured image on the display based on execution by the processor of a camera application;
    during the displaying of the captured image, displaying on the display an option to assign the captured image to a contact record stored in the memory;
    in response to receiving a first selection indicating selection of the option to assign the captured image to a contact record stored in the memory, displaying on the display a contact name that identifies the contact record stored in the memory;
    receiving a second selection of the contact name that identifies the contact record; and
    associating, based on the second selection, at least a portion of the captured image with the contact record identified by the contact name.

2. The method of claim 1, further comprising displaying on the display at least one option for altering the captured image before the associating.

3. The method of claim 2, wherein the altering comprises at least one of cropping, zooming, and rotating the captured image.

4. The method of claim 3, wherein the altering comprises cropping, and the captured image is cropped based on an adjustable crop area.

5. The method of claim 4, wherein the adjustable crop area is a movable shape configured according to an address book application executed by the processor.

6. The method of claim 1, further comprising storing the at least a portion of the captured image within the contact record or in association with the contact record.

7. The method of claim 1, further comprising after the associating, displaying the contact record and the at least a portion of the captured image based on execution by the processor of an address book application or a personal information manager application.

8. A device comprising:
    a processor; and
    a memory storing instructions which, when executed by the processor, cause:
    capturing an image using a camera of the device and displaying the captured image on the display based on execution by the processor of a camera application;
    during the displaying of the image, displaying on the display an option to assign the captured image to a contact record stored in the memory;
    in response to receiving a first selection indicating selection of the option to assign the captured image to a contact record stored in the memory, displaying on the display a contact name that identifies the contact record stored in the memory;
    receiving a second selection of the contact name that identifies the contact record; and
    associating, based on the second selection, at least a portion of the captured image with the contact record identified by the contact name.

9. The device of claim 8, wherein the instructions further cause displaying on the display at least one option for altering the captured image before the associating.

10. The device of claim 9, wherein the altering comprises at least one of cropping, zooming, and rotating the captured image.

11. The device of claim 10, wherein the altering comprises cropping, and the captured image is cropped based on an adjustable crop area.

12. The device of claim 11, wherein the adjustable crop area is a shape movable on the display, the adjustable crop area configured according to an address book application executed by the processor.

13. The device of claim 8, wherein the instructions further cause storing the at least a portion of the captured image within the contact record or in association with the contact record.

14. The device of claim 8, wherein the instructions further cause, after the associating, displaying the contact record and the at least a portion of the captured image based on execution by the processor of an address book application or a personal information manager application.

15. A non-transitory computer-readable medium storing instructions which, when executed, cause a processor of a device to perform operations of:
    capturing an image using a camera of the device and displaying the captured image on a display of the device based on execution by the processor of a camera application;
    during the displaying of the image, displaying on the display an option to assign the captured image to a contact record stored in the memory;
    in response to receiving a first selection indicating selection of the option to assign the captured image to a contact record stored in a memory of the device, displaying on the display a contact name that identifies the contact record stored in the memory;
    receiving a second selection of the contact name that identifies the contact record; and
    associating, based on the second selection, at least a portion of the captured image with the contact record identified by the contact name.

16. The non-transitory computer-readable medium of claim 15, wherein the instructions further cause displaying on the display at least one option for altering the captured image before the associating.

17. The non-transitory computer-readable medium of claim 16, wherein the altering comprises at least one of cropping, zooming, and rotating the captured image.

18. The non-transitory computer-readable medium of claim 17, wherein the altering comprises cropping, and the captured image on the display is cropped based on an adjustable crop area.

19. The non-transitory computer-readable medium of claim 18, wherein the adjustable crop area is a movable shape configured according to an address book application executed by the processor.

20. The non-transitory computer-readable medium of claim 15, wherein the instructions further cause storing the at least a portion of the captured image within the contact record or in association with the contact record.

* * * * *